(12) United States Patent
Lu et al.

(10) Patent No.: US 12,117,803 B2
(45) Date of Patent: Oct. 15, 2024

(54) SERVO ACTUATOR AND FAST SELF-TUNING METHOD OF GAIN FOR USING THE SAME

(71) Applicant: DELTA ELECTRONICS, INC., Taoyuan (TW)

(72) Inventors: Yen-Ming Lu, Taoyuan (TW); Chung-Hsin Cheng, Taoyuan (TW)

(73) Assignee: DELTA ELECTRONICS, INC., Taoyuan (TW)

( * ) Notice: Subject to any disclaimer, the term of this patent is extended or adjusted under 35 U.S.C. 154(b) by 222 days.

(21) Appl. No.: 17/877,823

(22) Filed: Jul. 29, 2022

(65) Prior Publication Data

US 2023/0236572 A1    Jul. 27, 2023

Related U.S. Application Data

(60) Provisional application No. 63/302,689, filed on Jan. 25, 2022.

(30) Foreign Application Priority Data

May 6, 2022 (CN) .......................... 202210486409.3

(51) Int. Cl.
B62D 15/02 (2006.01)
G05B 19/4155 (2006.01)

(52) U.S. Cl.
CPC ........... *G05B 19/4155* (2013.01); *G05B 2219/41016* (2013.01)

(58) Field of Classification Search
CPC .............. B62D 15/0245; B62D 5/0469; G05B 19/4155; G05B 2219/41016; H02P 21/143
See application file for complete search history.

(56) References Cited

U.S. PATENT DOCUMENTS

| 7,684,879 B2 | 3/2010 | Yutkowitz |
| 10,416,612 B2 | 9/2019 | Mori et al. |
| 10,564,619 B2 | 2/2020 | Tsuneki et al. |
| 10,648,318 B2 | 5/2020 | Song et al. |

(Continued)

FOREIGN PATENT DOCUMENTS

| CN | 102637011 B | 2/2014 |
| JP | 2007156699 A | 6/2007 |
| TW | 201633669 A | 9/2016 |

OTHER PUBLICATIONS

Office Action dated Nov. 17, 2022 of the corresponding Taiwan patent application No. 111117139.

*Primary Examiner* — Cortez M Cook
(74) *Attorney, Agent, or Firm* — Chun-Ming Shih; HDLS IPR SERVICES

(57) ABSTRACT

A fast self-tuning method of gain applied to a servo actuator connected with a motor is disclosed and includes following steps: retrieving a current-feedback information of the motor to compute a torque estimated value; retrieving a position-feedback information of the motor to compute an acceleration estimated value; computing a system inertia based on the torque estimated value and the acceleration estimated value, wherein the system inertia indicates an inertia of the motor carrying a specific load; computing an estimated control gain for the servo actuator based on the system inertia; and, performing a self-tuning procedure by the servo actuator in accordance with the estimated control gain.

20 Claims, 7 Drawing Sheets

(56) References Cited

U.S. PATENT DOCUMENTS

| | | |
|---|---|---|
| 2002/0026270 A1* | 2/2002 | Kurishige .......... B62D 15/0245 |
| | | 180/443 |
| 2007/0143040 A1 | 6/2007 | Ide |
| 2007/0284180 A1* | 12/2007 | Suehiro ................ B62D 5/0469 |
| | | 180/444 |
| 2013/0238101 A1 | 9/2013 | Kuramoto et al. |
| 2016/0070252 A1 | 3/2016 | Imada et al. |
| 2017/0045870 A1 | 2/2017 | Yang et al. |

* cited by examiner

SERVO ACTUATOR AND FAST SELF-TUNING METHOD OF GAIN FOR USING THE SAME

CROSS-REFERENCE TO RELATED APPLICATION

This patent application claims the benefit of U.S. Provisional Patent Application No. 63/302,689, filed Jan. 25, 2022, which is incorporated by reference herein.

BACKGROUND OF THE DISCLOSURE

Technical Field

The present disclosure relates to a servo actuator, and specifically to a servo actuator that may automatically tune the control gain, and to a self-turning method used by the servo actuator.

Description of Related Art

Industrial machines use one or more motors to carry loads to work, and each of the machines is configured with one or more servo actuators to respectively control these motors. The servo actuator records multiple parameters; however, users usually don't know how to set these parameters for the machines to operate more stably.

Generally, the machine may be configured with an automatic gain tuning function (also called as an auto-tuning function) in order to assist the user to set the aforementioned parameters. The automatic gain tuning function is written to be the computer software as the process based on expert's experiences. Or, the automatic gain tuning function is recorded directly in the servo actuator. According to the automatic gain tuning function, users who aren't familiar with the machine may be guided by the user interface (UI) on the computer or the servo actuator and then perform such processes step-by-step to set the gain(s) of the servo actuator. By using the above function, only few machines that cannot be processed through the automatic gain tuning function need professionals to go to the scene in order to solve the problem. As a result, the huge labor costs may be reduced.

As mentioned above, in order for the users to perform setting to the machines, the auto tuning function of the related art is usually used incorporated with computer software to generate the UI that may guide the user to perform the setting. In that case, a part of environments (such as dust-free rooms) that are forbidden to use computer is unable to implement the auto tuning function. Also, some environments having the computer equipment that are forbidden to install software due to information security are unable to implement the auto tuning function as well.

Besides, the automatic gain tuning function of the related art usually controls the machine to enable a controlled component to move between two points. In order to do so, a motor of the machine needs to rotate for at least one to three circles. For machines (such as robotic arms) that have a controlled component having different characteristics at different positions or machines that may control the controlled component to move only for a very short distance, but it cannot implement this type of automatic gain tuning function.

The approach that a machine enables its controlled component to move between two points needs two to three minutes to finish the entire gain tuning procedure. For some industrial environments, this kind of gain tuning procedure is lack of efficiency.

SUMMARY OF THE DISCLOSURE

The present disclosure is directed to a servo actuator and a fast self-tuning method of gain used by the servo actuator, which may complete a gain tuning procedure for the servo actuator in a very short time and only require a slight movement of the motor while executing the gain tuning procedure.

In one of the exemplary embodiments, the fast self-tuning method of gain is applied by an actuator connected with a motor and includes following steps:

a) retrieving a current feedback signal of the motor and computing a torque estimated value based on the current feedback signal;

b) retrieving a position feedback signal of the motor and computing an acceleration estimated value based on the position feedback signal;

c) computing a system inertia in accordance with the torque estimated value and the acceleration estimated value, wherein the system inertia is an inertia of the motor carrying a load;

d) computing an estimated control gain in accordance with a no-load inertia of the motor and the system inertia; and e) tuning the actuator by using the estimated control gain.

In one of the exemplary embodiments, the servo actuator is electrically connected with a motor, the motor carries a load, and a controlled system is formed by the motor and the load. The servo actuator includes:

a current detecting component, receiving an exciting current of the motor and generating a current feedback signal;

a central processing unit (CPU), electrically connected with the current detecting component and the motor, and comprising:

a torque estimating module, computing a torque estimated value based on the current feedback signal;

an acceleration estimating module, receiving a position feedback signal of the motor and computing an acceleration estimated value based on the position feedback signal;

a gain computing module, computing a system inertia correspondingly based on the torque estimated value and the acceleration estimated value, and computing an estimated control gain based on a no-load inertia of the motor and the system inertia, wherein the system inertia is an inertia of the motor carrying the load; and a controlling module, tuning the servo actuator based on the estimated control gain; and a storage, connected with the CPU, recording a data array including the torque estimated value and the acceleration estimated value, and the CPU is configured to read the data array to obtain the torque estimated value and the acceleration estimated value.

In comparison with related art, the present disclosure may automatically complete the gain tuning procedure after the servo actuator is activated, wherein the execution time of the gain tuning procedure is short without requiring a large degree of movement of the motor, and it is unnecessary to store a large amount of data for the execution of the gain tuning procedure.

DETAILED DESCRIPTION OF THE DISCLOSURE

In cooperation with the attached drawings, the technical contents and detailed description of the present disclosure are described hereinafter according to multiple embodiments, being not used to limit its executing scope. Any equivalent variation and modification made according to appended claims is all covered by the claims claimed by the present disclosure.

Figure 1:
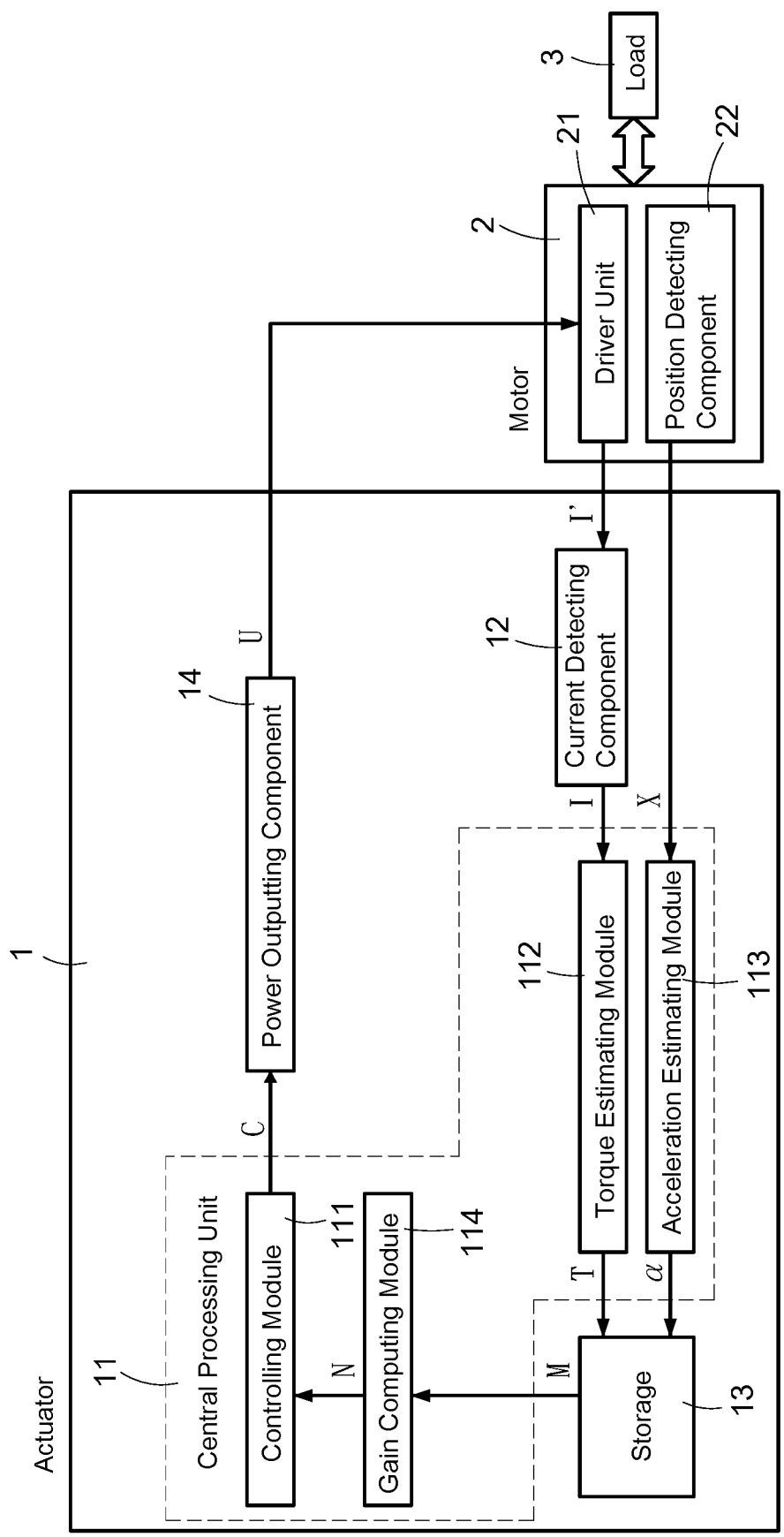
FIG. 1 is a block diagram of a servo actuator system of an embodiment according to the present disclosure.
Figure 2:
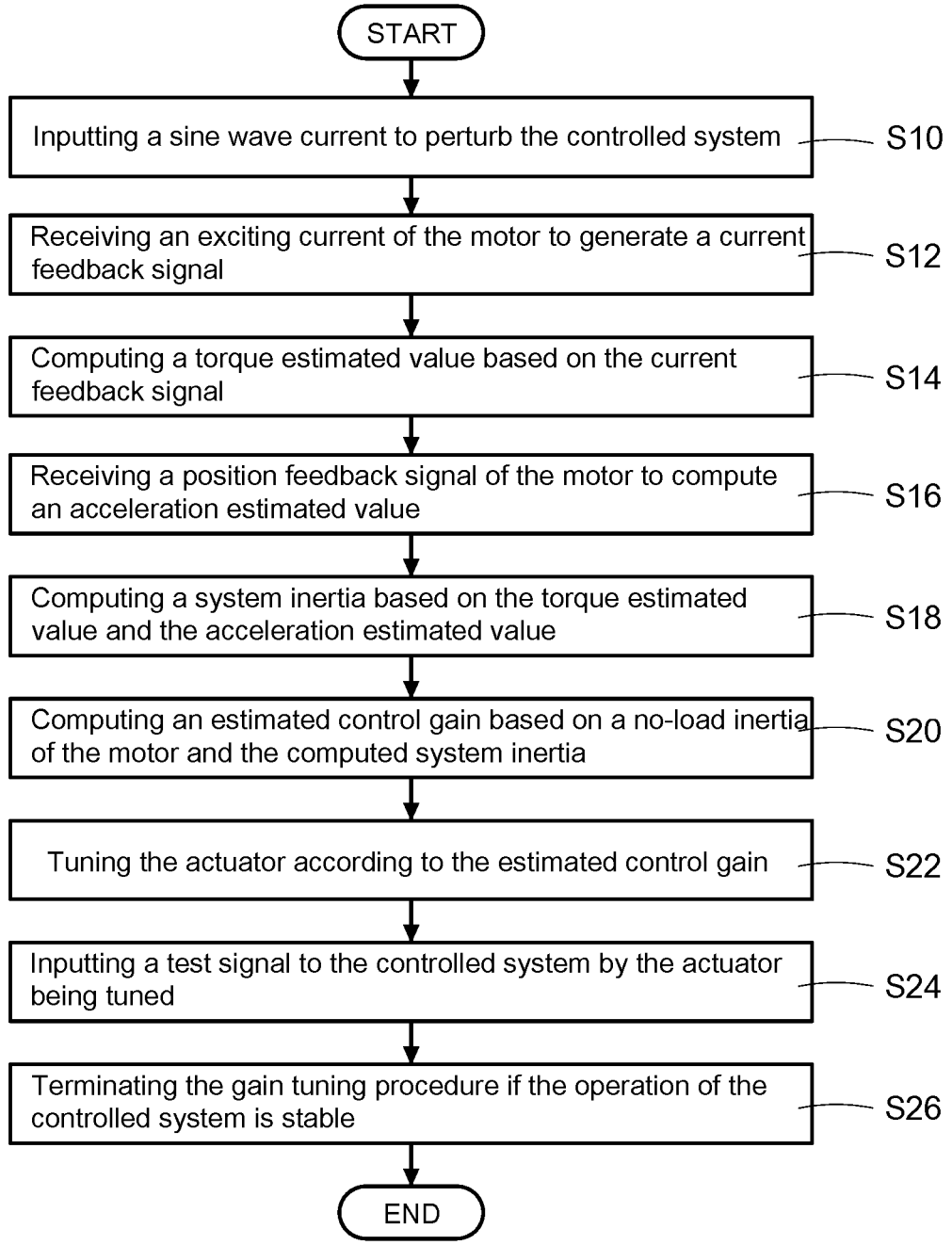
FIG. 2 is a flowchart of a tuning method of an embodiment according to the present disclosure.

Please refer to FIG. 1 and FIG. 2, wherein FIG. 1 is a block diagram of a servo actuator system of an embodiment according to the present disclosure and FIG. 2 is a flowchart of a tuning method of an embodiment according to the present disclosure. FIG. 1 discloses a servo actuator system, wherein the servo actuator system includes a servo actuator (referred to as the actuator 1 hereinafter) and a controlled system electrically connected with the actuator 1. The controlled system at least includes a motor 2 electrically connected with the actuator 1 and a load 3 carried by the motor 2.

One technical feature of the present disclosure is that, after the actuator 1 is activated or the actuator 1 accepts the setting from the user to activate an automatic gain tuning function (also called as auto-tuning function), the actuator 1 may automatically perform tuning for internal control gain (s) aimed at the controlled system currently connected therewith. After being controlled by the actuator 1, the controlled system may operate stably.

In one embodiment, a user may use a user interface (UI) or other media to set an auto-tuning parameter(s) of the actuator 1 (for example, to enable a internal flag of the actuator 1). When the actuator 1 detects that the auto-tuning parameter is enabled, it may automatically detect the status of the controlled system currently connected therewith, and the actuator 1 may perform the fast self-tuning method of gain of the present disclosure to implement the automatic gain tuning function.

As disclosed in FIG. 1, the actuator 1 of the present disclosure at least includes a central processing unit (CPU) 11, a current detecting component 12, a storage 13, and a power outputting component 14, wherein the current detecting component 12, the storage 13, and the power outputting component 14 are electrically connected with the CPU 11.

In the present disclosure, the CPU 11 records firmware, and the firmware is virtually divided into a controlling module 111, a torque estimating module 112, an acceleration estimating module 113, and a gain computing module 114 based on the functions executed by the CPU 11. In other words, the controlling module 111, the torque estimating module 112, the acceleration estimating module 113, and the gain computing module 114 are firmware modules implemented by the firmware of the CPU 11. In the present disclosure, the CPU 11 uses the gain computing module 114 to compute a control gain correspondingly in according to the status of the controlled system and to automatically tune the actuator 1 based on the computed control gain (detailed described in the following).

The motor 2 at least includes a driver unit 21 and a position detecting component 22, and the motor 2 directly connects to a load 3 or indirectly connects to the load 3 through a linking device (such as a belt or a connecting rod, etc.). In one embodiment, the actuator 1 connects to the motor 2 through the CPU 11, the current detecting component 12, and the power outputting component 14. As shown in FIG. 1, the CPU 11 sends a voltage command C to the power outputting component 14, and the power outputting component 14 generates a motor voltage U correspondingly based on the voltage command C and outputs the motor voltage U to the motor 2 in order to control the motor 2.

The motor 2 receives the motor voltage U from the actuator 1 through the driver unit 21, and the motor 2 is driven by the driver unit 21 to rotate. After rotating, the motor 2 may bring the load 3 to operate. The motor 2 detects and records a position feedback signal X of the motor 2 through the position detecting component 22 and transmits the position feedback signal X back to the actuator 1. Also, the motor 2 transmits an exciting current I' to the actuator 1 through the driver unit 21. The actuator 1 receives the exciting current I' from the motor 2 through the current detecting component 12, and then generates a current feedback signal I correspondingly based on the exciting current I'.

Please refer to FIG. 1 and FIG. 2 at the same time, wherein FIG. 2 is a flowchart of a tuning method of an embodiment according to the present disclosure. FIG. 2 discloses specific steps of the fast self-tuning method of gain of the present disclosure (referred to as the tuning method hereinafter). The tuning method is substantially applied to the actuator 1 as shown in FIG. 1.

In the disclosure, the actuator 1 has multiple configurable and tunable parameters, and the multiple parameters include one auto-tuning parameter. In order for the actuator 1 to execute the tuning method of the present disclosure to implement the automatic gain tuning function, a user needs to enable the auto-tuning parameter of the actuator 1 by using an UI (not shown). After an enabled auto-tuning parameter is detected, the actuator 1 may automatically input a sine wave current corresponding to a single frequency sine wave to the controlled system, so as to perturb the controlled system and then obtain a corresponding information from the controlled system (step S10). Therefore, the actuator 1 may perform the tuning method of the present disclosure based on the obtained information.

After receiving the sine wave current, the motor 2 may perform a slight movement; meanwhile, the actuator 1 may receive an exciting current outputted from the motor 2, and the current detecting component 12 may generate a current feedback signal correspondingly based on the exciting current (step S12). Also, the actuator 1 retrieves the current feedback signal through the torque estimating module 112 of the CPU 11 and computes a torque estimated value based on the current feedback signal (step S14).

After the motor 2 moves, the actuator 1 may also receive a position feedback signal outputted from the motor 2 through the acceleration estimated module 113 of the CPU 11, and the actuator 1 may compute an acceleration estimated value based on the position feedback signal (step S16).

As mentioned above, the controlled system in the embodiment includes the motor 2 and the load 3 carried by the motor 2. The aforementioned torque estimated value indicates the torque generated by the motor 2 when the motor 2 moves with the load 3, and the aforementioned acceleration estimated value indicates the acceleration generated by the motor 2 when the motor 2 moves with the load 3. Besides, the step S12, the step S14, and the step S16 do not have a fixed execution order. In particular, the CPU 11 may compute the torque estimated value and the acceleration estimated value based on an arbitrary order; otherwise, the CPU 11 may compute the torque estimated value and the acceleration estimated value at the same time by way of multiplexing, and not limited to the execution order as shown in FIG. 2.

After the step S14 and the step S16, the actuator 1 obtains the torque estimated value and the acceleration estimated value through the gain computing module 114 of the CPU 11 and uses the gain computing module 114 to compute a system inertia correspondingly based on the torque estimated value and the acceleration estimated value (step S18). In particular, the system inertia of the embodiment indicates an inertia of the motor 2 while carrying the load 3. Be more specific, the system inertia is the weight of load 3 currently carried by the motor 2.

In one embodiment, the gain computing module 114 may compute the system inertia in accordance with a first formula:

$$J = \frac{T}{\alpha},$$

wherein J indicates the system inertia, T indicates the torque estimated value, and a indicates the acceleration estimated value. However, the above description is only one of the exemplary embodiments of the present disclosure, but not limited thereto.

It should be mentioned that the actuator 1 may include a storage 13 connected with the CPU 11. The storage 13 may be, for example but not limited to, any kind of memory.

In one embodiment, the torque estimating module 112 stores the computed torque estimated value to the storage 13 after the step S14 and the acceleration estimating module 113 stores the computed acceleration estimated value to the storage 13 after the step S16. In the embodiment, the storage 113 stores a data array (such as a data array M as disclosed in FIG. 1) recording the torque estimated value and the acceleration estimated value. In the step S18, the gain computing module 114 of the CPU 11 may inquire the data array M in the storage 113 to obtain the torque estimated value and the acceleration estimated value and then compute the system inertia in accordance with the torque estimated value and the acceleration estimated value.

Figure 3:
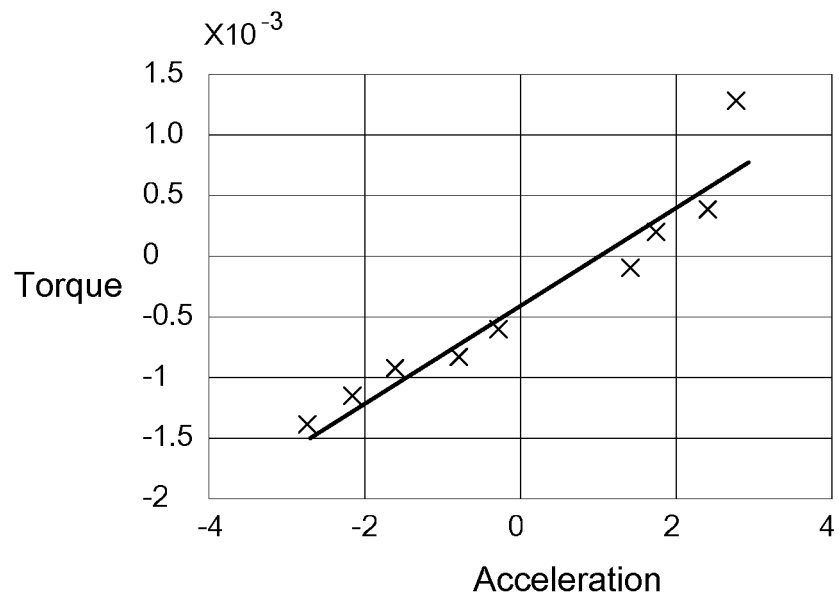
FIG. 3 is a schematic diagram showing an inertia of an embodiment according to the present disclosure.

Please refer to FIG. 3 at the same time, wherein FIG. 3 is a schematic diagram showing an inertia of an embodiment according to the present disclosure. As mentioned above, the CPU 11 of the present disclosure computes the system inertia based on the torque estimated value and the acceleration estimated value. Because the system inertia is computed based on values that are estimated, the system inertia being computed may have an error.

In the embodiment of FIG. 3, the actuator 1 causes the motor 2 to move by inputting the sine wave current, and the CPU 11 obtains multiple torque estimated values and multiple acceleration estimated values respectively at multiple time points while the motor 2 moves. In the embodiment, the gain computing module 114 of the CPU 11 may execute a first-order linear regression calculation in accordance with the torque estimated values and the acceleration estimated values of the multiple time points to generate a regression line. Therefore, the gain computing module 114 of the CPU 11 may regard the slope of the regression line as the system inertia of the controlled system.

For example, the sine wave current may be corresponding to a single frequency sine wave with a frequency of 5 Hz, which means the corresponding time of the single frequency sine wave is 200 ms. In the embodiment, the CPU 11 may compute one torque estimated value and one acceleration estimated value in every 20 ms after the sine wave current is inputted; therefore, the CPU 11 may compute the system inertia of the controlled system based on ten torque estimated values and ten acceleration estimated values. However, the above time and amount are only presented for an instance, but not intended to limit the scope of the invention.

The present disclosure executes the first-order liner regression calculation based on multiple torque estimated values and multiple acceleration estimated values to compute the system inertia, so that the system inertia may be computed more accurate. Besides, it is unnecessary for the actuator 1 to store a large amount of data just for the computation of the system inertia. As a result, it is unnecessary for the actuator 1 to arranged a huge memory. Since no huge storage space is unnecessary, the present disclosure may use the actuator 1 directly to implement the self-tuning procedure of the control gain without additional computer equipment.

Please refer back to FIG. 2. After the step S18, the gain computing module 114 may compute an estimated control gain (such as the estimated control gain N as disclosed in FIG. 1) correspondingly based on a no-load inertia of the motor 2 and the computed system inertia (step S20) and provide the estimated control gain to the controlling module 111. In one embodiment, the estimated control gain may, for example but not limited to, include a position gain used by a position controller 116 (as shown in the FIG. 7) of the actuator 1 and a velocity gain used by a velocity controller 117 (as shown in the FIG. 7) of the actuator 1.

In particular, the no-load inertia of the motor 2 is fixed after the motor 2 is manufactured, so the no-load inertia of the motor 2 belongs to one of the known information of the actuator 1. Accordingly, the gain computing module 114 may compute each parameter (i.e., an estimated control gain(s)) that the actuator 1 should apply based on the no-load inertia of the motor 2 and the system inertia being estimated, so that the actuator 1 may control the controlled system to move stably.

Figure 4:
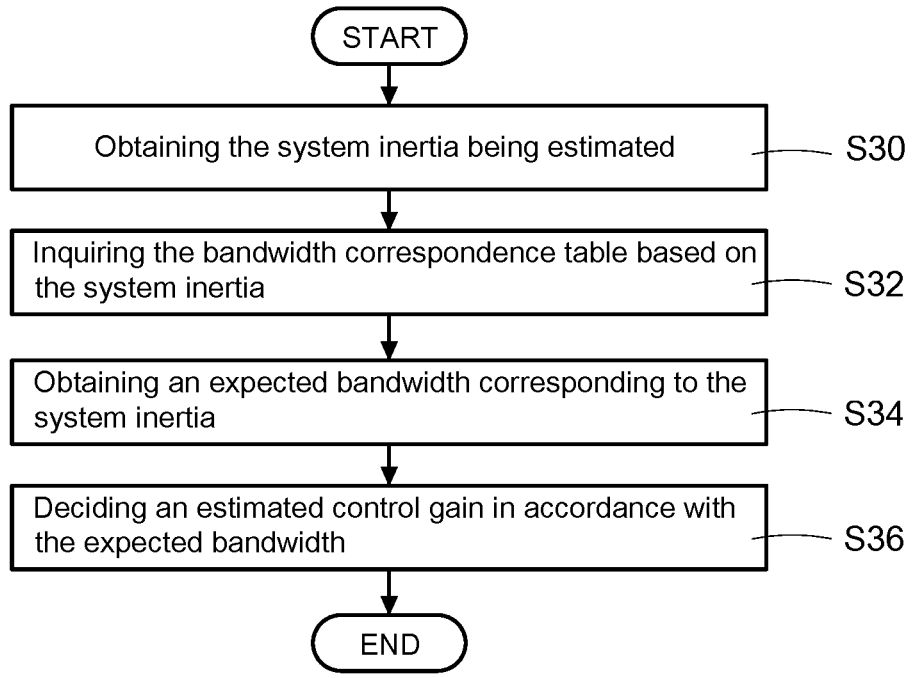
FIG. 4 is a control gain setting flowchart of an embodiment according to the present disclosure.

Please refer to FIG. 4 at the same time, wherein FIG. 4 is a control gain setting flowchart of an embodiment according to the present disclosure. FIG. 4 is presented to further interpret the step S20 of FIG. 2.

In one embodiment, the actuator 1 may internally create a bandwidth correspondence table (not shown), and the bandwidth correspondence table previously records multiple expected bandwidths respectively corresponding to different system inertias, wherein each of the system inertias is inversely proportional to its corresponding expected bandwidth. In other words, the smaller the system inertia, the bigger the expected bandwidth is. The bigger the system inertia, the smaller the expected bandwidth is. For example, the bandwidth correspondence table may record that a first load with a ten-time inertia corresponds to an expected bandwidth of 100 Hz and a second load with a hundred-time inertia corresponds to an expected bandwidth of 10 Hz. However, the above descriptions are only few embodiments of the present disclosure, but not limited thereto.

In the embodiment, the gain computing module 114 first obtains the system inertia estimated in the step S18 (step S30), and then inquires the bandwidth correspondence table based on the system inertia (step S32). Therefore, an expected bandwidth corresponding to the system inertia may be obtained from the bandwidth correspondence table (step S34). Besides, the gain computing module 114 may decide an estimated control gain to be used by the actuator 1 in accordance with the expected bandwidth (step S36). In other words, the estimated control gain being used to tune the actuator 1 in the present disclosure is directly related to the expected bandwidth corresponding to the system inertia of the controlled system currently connected with the actuator 1. However, the above description is only one of the exemplary embodiments of the present disclosure, but not limited thereto.

Refer back to FIG. 2. After the step S20, the CPU 11 may tune the actuator 1 through the controlling module 111 by using the estimated control gain provided by the gain computing module 114 (step S22).

By using the tuning method of the present disclosure, the user doesn't have to use additional computer software or to set the control gain of the actuator 1 following the guide given from the computer UI. In comparison, all the user needs to do is to enable a corresponding parameter (such as to tick the auto-tuning parameter) of the actuator 1, and then the automatic gain tuning function may be activated for the actuator 1 to automatically complete the gain tuning procedure, which is very convenient.

In one scenario, the actuator 1 may automatically complete the setting of multiple parameters after being tuned by the controlling module 111, so that the actuator 1 may control the controlled system to move stably. However, the CPU 11 of the present disclosure computes the estimated control gain based on the system inertia that is estimated, and the system inertia estimated in the step S20 may have an error in comparison with the actual system inertia of the controlled system. According to the problem, the present disclosure may further test the actuator 1 after the actuator 1 is tuned.

As shown in FIG. 2, after the step S22, the actuator 1 being tuned may input a test signal to the controlled system (step S24), so that the motor 2 of the controlled system may perform operation. In the embodiment, the test signal mentioned above is corresponding to a square wave current. The present disclosure makes the actuator 1 being tuned to generate the square wave current to perturb the motor 2, so the present disclosure may confirm whether the operation of the controlled system is stable when the actuator 1 applies the expected bandwidth currently inquired. If the operation of the controlled system is stable, the actuator 1 may terminate the gain tuning procedure for this time (step S26). If the operation of the controlled system is unstable (for example, the controlled system vibes), the actuator 1 tunes the estimated control gain currently applied through the CPU 11 (detailed described in the following).

Figure 5:
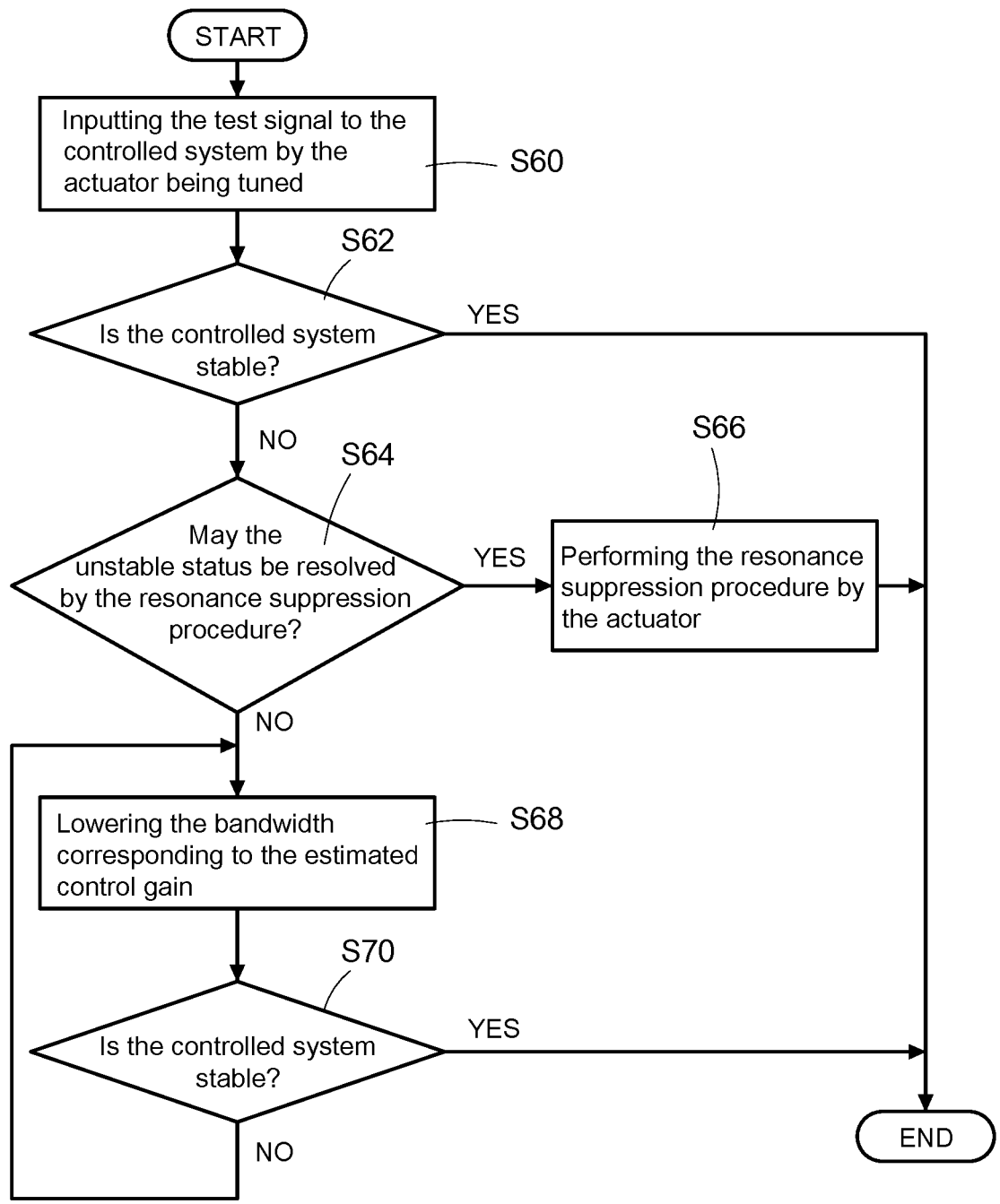
FIG. 5 is a flowchart for determining stability of an embodiment according to the present disclosure.

Please refer to FIG. 1, FIG. 2, and FIG. 5 at the same time, wherein FIG. 5 is a flowchart for determining stability of an embodiment according to the present disclosure. As shown in FIG. 5, after being tuned based on the estimated control gain, the actuator 1 being tuned may input the test signal to the controlled system (step S60). In the meantime, the motor 2 of the controlled system may be perturbed and then perform operations accordingly, and the actuator 1 may determine whether the controlled system is stable while the motor 2 is operating (step S62).

More specific, the test signal mentioned above is a pulse sent by the actuator 1 aimed at the controlled system, and the test signal may cause the controlled system (especially the motor 2) to perform a slight movement. In one embodiment, the actuator 1 determines, in the step S62, whether the operation of the motor 2 causes unnecessary vibration to the controlled system after the actuator 1 applies a new control gain (i.e., the estimated control gain) to control the controlled system.

If the controlled system is determined to be stable in the step S62, the tuning method of the present disclosure may be terminated and the gain tuning procedure of the actuator 1 may be completed.

If the controlled system is determined to be unstable in the step S62, the actuator 1 evaluates the unstable status of the controlled system by the CPU 11, so as to determine whether the unstable status may be resolved by the actuator 1 through performing a resonance suppression procedure (step S64).

In particular, the bandwidth corresponding to the estimated control gain computed by the gain computing module 114 is known to the CPU 11. Also, the actuator 1 may monitor a vibration frequency of the controlled system under the unstable status. In the step S64, the CPU 11 may directly determine whether the unstable status of the controlled system can be resolved by the resonance suppression procedure in accordance with the relationship between the bandwidth of the estimated control gain and the vibration frequency of the controlled system.

If the controlled system is determined to be unstable where the unstable status may be resolved by the resonance suppression procedure, the CPU 11 controls the actuator 1 to perform the resonance suppression procedure (step S66). In the embodiment, the CPU 11 restores the controlled system back to a stable status (e.g., no longer vibrate) through performing the resonance suppression procedure without retuning the control gain of the actuator 1.

If the controlled system is determined to be unstable and the unstable status cannot be resolved through the resonance suppression procedure, it means that the estimated control gain computed by the gain computing module 114 is too high. In this scenario, the CPU 11 may lower the bandwidth corresponding to the estimated control gain computed by the gain computing module 114 (step S68).

After the step S68, the CPU 11 re-tunes the actuator 1 based on the estimated control gain with the lowered bandwidth, and then the CPU 11 again determines whether the controlled system is stable through same approach as mentioned above (e.g., inputs the test signal) (step S70). If the controlled system is determined to be stable this time, the CPU 11 terminates the tuning method of the present disclosure and completes the gain tuning procedure of the actuator 1. If the controlled system is determined to be unstable, the CPU 11 re-executes the step S68 to again lower the bandwidth corresponding to the estimated control gain and then re-tunes the actuator 1 in accordance with the estimated control gain with the lowered bandwidth.

As mentioned above, the test signal sent out by the actuator 1 only cause the controlled system (especially the motor 2) to slightly move, and the actuator 1 may determine whether the controlled system is stable based on the slight movement of the motor 2. In one embodiment, when performing the tuning method of the present disclosure, the actuator 1 only cause the motor 2 to rotate no more than one-tenth of a circle (i.e., smaller than or equal to 36 degrees). To sum up, the hardware structure of the controlled system being used incorporated with the tuning method of the present disclosure may be more flexible.

In order to successfully estimate the system inertia, the actuator 1 must ensure that the motor 2 may generate a greater velocity response during the slight movement. Therefore, the actuator 1 may compute an effective acceleration estimated value while the motor 2 moves and eventually estimate the system inertia correspondingly.

Figure 6:
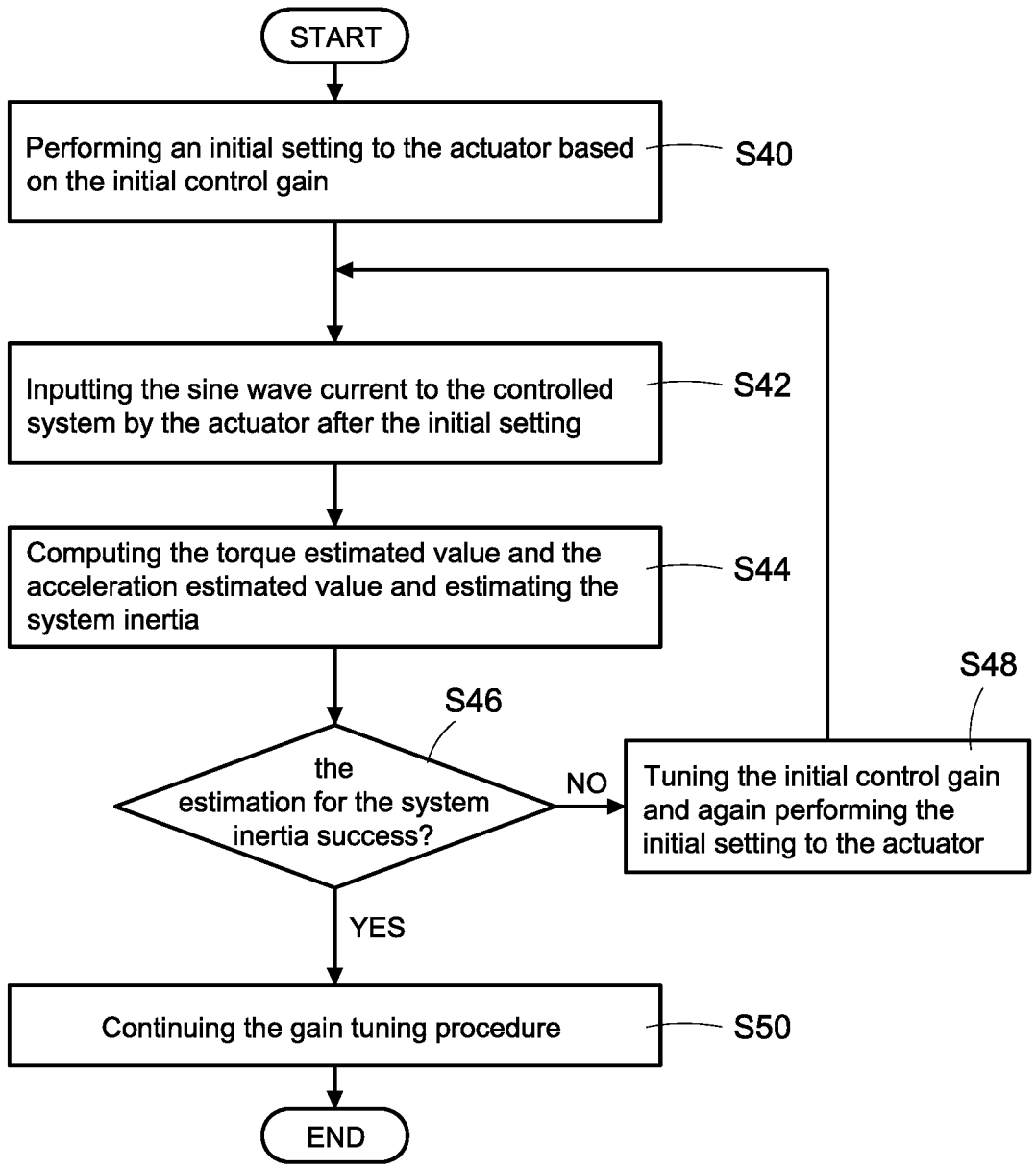
FIG. 6 is an inertia estimating flowchart of an embodiment according to the present disclosure.
Figure 7:
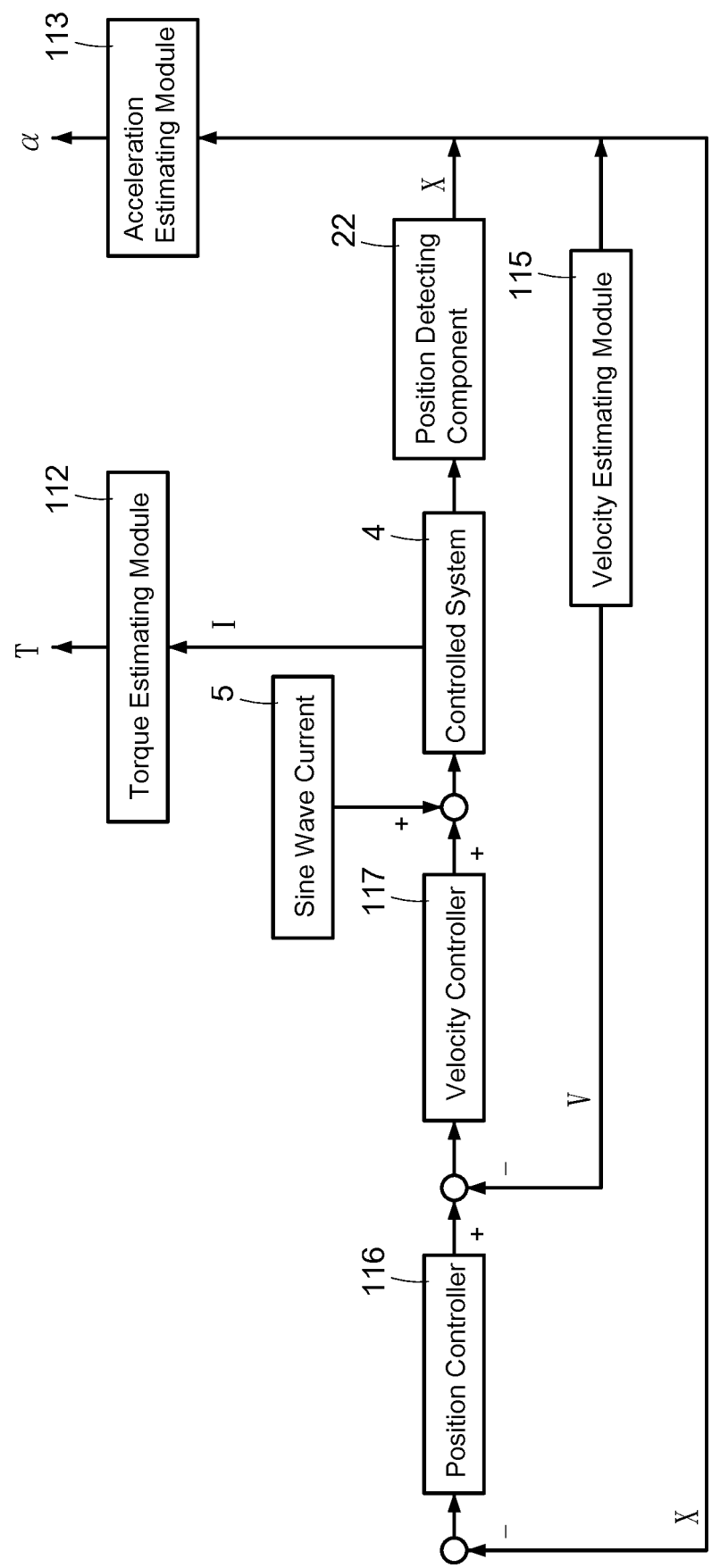
FIG. 7 is a schematic diagram showing a control architecture of an embodiment according to the present disclosure.

Please refer to FIG. 1, FIG. 2, FIG. 6, and FIG. 7 at the same time, wherein FIG. 6 is an inertia estimating flowchart of an embodiment according to the present disclosure and FIG. 7 is a schematic diagram showing a control architecture of an embodiment according to the present disclosure.

Before enabling the actuator 1 to perform the gain tuning procedure, the user may set an initial control gain in accordance with the specification of the motor 2 currently connected with the actuator 1, and the controlling module 111 of the CPU 11 may perform an initial setting to the actuator 1 based on the initial control gain (step S40). In one embodiment, the initial control gain at least includes a position gain being set based on the specification of the motor 2 for a position controller 116 in the actuator 1 and a velocity gain being set based on the specification of the motor 2 for the velocity controller 117 in the actuator 1.

As mentioned above, the present disclosure sets the initial control gain based on the specification of the motor 2. After performing an initial setting to the actuator 1 in accordance with the initial control gain, the actuator 1 may be used to test the controlled system. Therefore, the tuning result may not be affected by the original parameters (such as the parameters randomly and arbitrarily set by the user) of the actuator 1.

After the step S40, the actuator 1 after the initial setting may input the aforementioned sine wave current to the controlled system (step S42) so as to perturb the motor 2 (i.e., to cause the motor 2 performing a slight movement). In particular, the step S42 is similar to the step S10 of FIG. 2, detailed description is omitted here.

In order to shorten the estimated time of estimating the system inertia, the actuator 1 must control the motor 2 to complete the required movement in a very short time. To do so, the frequency of the single frequency sine wave corresponding to the sine wave current may not be too low. On the other hand, in order to prevent the motor 2 from vibrating while performing the movement, the frequency of the single frequency sine wave corresponding to the sine wave current may not be too high either (for example, may not be greater than a system resonance frequency).

In one embodiment, the sine wave current may be corresponding to a single frequency sine wave with a frequency range within 5 Hz to 15 Hz. In other words, the perturbed time of the motor 2 caused by the sine wave current is about 66 ms to 200 ms. However, the above description is only one of the exemplary embodiments of the present disclosure, the frequency of the single frequency sine wave may be smaller than 5 Hz or greater than 15 Hz, and not limited within the above frequency range.

By setting the frequency range of the single frequency sine wave, the actuator 1 may shorten the estimated time of estimating the system inertia, so that the execution time of the entire gain tuning procedure may not exceed 1 second. Therefore, the efficiency of the actuator 1 may be greatly improved.

As mentioned above, if a single frequency sine wave with a frequency that is too small (e.g., smaller than 5 Hz) is used, the execution time of the entire gain tuning procedure may be too long to satisfy the user demand. In such circumstance, the actuator 1 may choose not to use an entire sine wave, so that the execution time of the gain tuning procedure may still be reduced. However, the above description is only one of the exemplary embodiments, but not limited thereto.

After the step S42, the actuator 1 may use the current detecting component 12, the torque estimating module 112, and the acceleration estimating module 113 to retrieve the current feedback signal and the position feedback signal of the motor 2 while the motor 2 is operating, so as to compute the torque estimated value and the acceleration estimated value, and then estimate the system inertia of the controlled system by the gain computing module 114 (step S44).

As mentioned, the gain computing module 114 estimates the system inertia based on the torque estimated value and the acceleration estimated value. If the velocity response of the motor 2 is insufficient during the perturbed time, the actuator 1 may not correctly compute the acceleration estimated value of the motor 2 and may not estimate the system inertia.

In the embodiment, the CPU 11 determines whether the estimation for the system inertia is successful after the step S44 (step S46). If the system inertia is estimated successfully, the CPU 11 may continue the rest part of the gain tuning procedure (step S50). For example, the CPU 11 may continue to execute the step S20 to the step S26 as shown in FIG. 2, but not limited thereto.

If the CPU 11 determines in the step S46 that the estimation for the system inertia fails, the CPU 11 may then tune the initial control gain obtained in the step S40 based on the feedback information of the motor 2 (e.g., the current feedback signal and the position feedback signal) and use the controlling module 111 to again perform the initial setting to the actuator 1 in accordance with the tuned initial control gain (step S48). Also, the CPU 11 re-executes the step S42 and the step S44 for the actuator 1 being tuned to re-send the sine wave current to the controlled system and receive the feedback information from the motor 2 for the estimation of the system inertia again.

More specific, the actuator 1 may input the sine wave current to the controlled system after the initial setting, then continually monitor the movement of the motor 2 being perturbed, and then compute the acceleration estimated value based on the position feedback signal of the motor 2. In order for the actuator 1 to successfully compute the acceleration estimated value, the motor 2 should be able to perform a large degree of movement in a very short time after being perturbed. In order to do so, the purpose of setting the content of the initial control gain and the frequency of the single frequency sine wave of the present disclosure is for the motor 2 to reach its maximum acceleration characteristics while it moves. Accordingly, if different motors 2 are attached, the initial control gain and the single frequency sine wave may be different.

As shown in FIG. 7, the actuator 1 of the present disclosure further includes a velocity estimating module 115, a position controller 116, and a velocity controller 117, wherein the velocity estimating module 115, the position controller 116, and the velocity controller 117 may be firmware modules of the CPU 11, but not limited thereto.

As disclosed in FIG. 7, when the controlled system (i.e., the motor 2 and the load 3) operates, the position detecting component 22 may output the position feedback signal X. After receiving the position feedback signal X, the actuator 1 may return the position feedback signal X to the position controller 116, the velocity estimating module 115 may compute the velocity feedback signal V of the motor 2 based on the position feedback signal X, and the velocity estimating module 115 may then return the velocity feedback signal V to the velocity controller 117.

The position controller 116 and the velocity controller 117 control the controlled system 4 based on the feedback signals, and the actuator 1 may input the sine wave current 5 to the controlled system 4. After being perturbed by the sine wave current 5, the controlled system 4 may output the current feedback signal I to the torque estimating module 112 of the actuator 1 and output the position feedback signal X to the acceleration estimating module 113 of the actuator 1. Therefore, the torque estimating module 112 may compute the torque estimated value T based on the current feedback signal I and the acceleration estimated module 113 may compute the acceleration estimated value a based on the position feedback signal X.

As mentioned above, if the actuator 1 cannot obtain an acceleration estimated value satisfied the requirement based on the movement of the motor 2, the step S48 of FIG. 6 should be executed to tune the initial control gain, wherein the tuning of the initial control gain includes tuning the position gain used by the position controller 116 and tuning the velocity gain used by the velocity controller 117. In particular, the actuator 1 enlarges the velocity response of the controlled system 4 under the frequency corresponding to the sine wave current 5 through the tuned initial control gain, so that the controlled system 4 may produce the acceleration that is large enough for satisfying the requirement after receiving the sine wave current 5.

Figure 8:
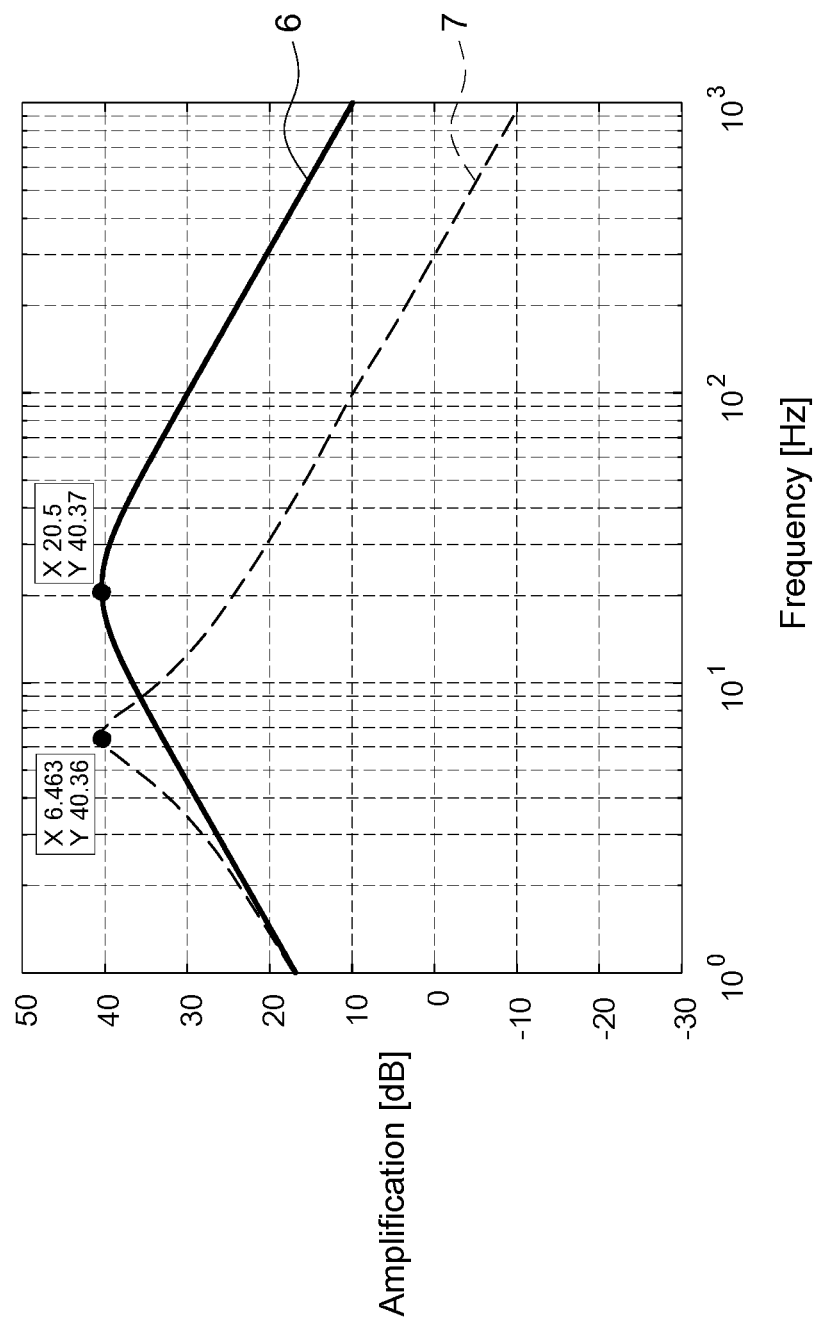
FIG. 8 is a schematic diagram showing frequency response of an embodiment according to the present disclosure.

Please refer to FIG. 8 at the same time, wherein FIG. 8 is schematic diagram showing frequency response of an embodiment according to the present disclosure. FIG. 8 discloses a response curve 6 of motor with no load of the controlled system 4 and also a response curve 7 of motor with twenty times load of the controlled system 4.

As shown in the FIG. 8, when the motor 2 is with no load, the highest amplification (40.37 dB) appears at the position corresponding to the frequency of 20.5 Hz. When the motor 2 is with twenty times load, the highest amplification (40.36 dB) appears at a position corresponding to the frequency of 6.463 Hz. It should be mentioned that the above information may be regarded as known information by testing the motor 2 after the motor 2 is manufactured.

According to the above information, the actuator 1 may choose a single frequency sine wave with a frequency between 6.4 Hz to 20.5 Hz to generate the sine wave current 5 in the step S42 of FIG. 6. In this scenario, the motor 2, from no load to carrying twenty times load, may generate a greater velocity response when getting perturbed by the sine wave current 5 and therefore the actuator 1 could successfully compute the acceleration estimated value a of the motor 2.

If the CPU 11 determines in the step S46 as shown in the FIG. 6 that the estimation for the system inertia fails, it means that the load carried by the motor 2 exceeds the aforementioned frequency range of the single frequency sine wave (for example, the motor 2 carries thirty times load).

In particular, the amplification (i.e., the dB value) as shown in FIG. 8 is depicted according to the velocity feedback and the position feedback of the motor 2. In the step S48 of FIG. 6, the CPU 11 of the actuator 1 may tune the position gain used by the position controller 116 and the velocity gain used by the velocity controller 117 based on the feedback signal of the motor 2, so as to enlarge the velocity response of the motor 2. Therefore, the actuator 1 may be assured in successfully obtaining the velocity estimated value and estimating the system inertia next time when the sine wave current 5 is inputted to the controlled system 4.

By using the technical solution of the present disclosure, the actuator may automatically complete the gain tuning procedure after being activated, wherein the execution time of the gain tuning procedure is short, the motor doesn't have to perform a large degree of movement, and the actuator doesn't have to store a large amount of data just for the execution of the gain tuning procedure.

As the skilled person will appreciate, various changes and modifications can be made to the described embodiment. It is intended to include all such variations, modifications and equivalents which fall within the scope of the present disclosure, as defined in the accompanying claims.

What is claimed is:

1. A fast self-tuning method of gain, used by an actuator connected with a motor, comprising:
   a) retrieving a current feedback signal of the motor and computing a torque estimated value based on the current feedback signal;
   b) retrieving a position feedback signal of the motor and computing an acceleration estimated value based on the position feedback signal;
   c) computing a system inertia in accordance with the torque estimated value and the acceleration estimated value, wherein the system inertia is an inertia of the motor carrying a load;
   d) computing an estimated control gain in accordance with a no-load inertia of the motor and the system inertia; and
   e) tuning the actuator by using the estimated control gain.

2. The fast self-tuning method in claim 1, further comprising:
   f) inputting a test signal to a controlled system including the motor and the load by the actuator being tuned, wherein the test signal causes the motor to perform an operation;
   g) determining whether the controlled system is stable while the motor performs the operation;
   h) controlling the actuator to perform a resonance suppression procedure when the controlled system is determined to be under an unstable status where the unstable status can be resolved by the resonance suppression procedure; and
   i) lowering a bandwidth corresponded to the estimated control gain and re-tuning the actuator based on the estimated control gain with the lowered bandwidth when the controlled system is determined to be under the unstable status and the unstable status cannot be resolved by the resonance suppression procedure.

3. The fast self-tuning method in claim 2, wherein the step h) and the step i) comprise determining whether the unstable status can be resolved by the resonance suppression procedure based on a relationship between the bandwidth corresponded to the estimated control gain and a resonance frequency of the controlled system under the unstable status.

4. The fast self-tuning method in claim 2, further comprises a step a1): before the step a), inputting a sine wave current to the controlled system to cause the motor to operate, wherein the step a) comprises retrieving the current feedback signal while the motor operates, and the step b) comprise retrieving the position feedback signal while the motor operates.

5. The fast self-tuning method in claim 4, wherein the sine wave current is corresponding to a single frequency sine wave within a frequency range between 5 Hz to 15 Hz.

6. The fast self-tuning method in claim 4, further comprising a step a0): before the step a1), performing an initial setting to the actuator based on an initial control gain, wherein the initial control gain at least comprises a position gain and a velocity gain set in accordance with a specification of the motor, wherein the step a1) comprises inputting the sine wave current to the controlled system by the actuator after the initial setting.

7. The fast self-tuning method in claim 6, further comprising:
   c1) after the step c), determining whether the system inertia is successfully estimated;
   c2) when an estimation for the system inertia fails, tuning the initial control gain and re-performing the initial setting to the actuator, and re-executing the step a0), the step a1), and the step a) to the step c);
   c3) when the estimation for the system inertial successes, executing the step d) based on the system inertia.

8. The fast self-tuning method in claim 7, wherein the step c2) comprises tuning the position gain and the velocity gain to enlarge a velocity response of the controlled system under the frequency corresponded to the sine wave current.

9. The fast self-tuning method in claim 2, wherein the step c) comprises computing the system inertia based on a first formula:

$$J = \frac{T}{\alpha},$$

wherein J is me system inertia, T is the torque estimated value, and a is the acceleration estimated value.

10. The fast self-tuning method in claim 2, wherein the step c) comprises executing a first-order linear regression calculation to generate a regression line based on the torque estimated value and the acceleration estimated value of multiple time points and regarding a slope of the regression line as the system inertia.

11. The fast self-tuning method in claim 2, wherein the actuator comprises a bandwidth correspondence table, the bandwidth correspondence table records expected bandwidths respectively corresponding to different system inertias, and the system inertias are inversely proportional to the expected bandwidths;
   wherein, the step d) comprises inquiring the bandwidth correspondence table by the system inertia to correspondingly obtain the expected bandwidth and deciding the estimated control gain based on the expected bandwidth being obtained.

12. A servo actuator, electrically connected with a motor, wherein the motor carries a load, a controlled system is formed by the motor and the load, and the servo actuator comprising:
   a current detecting component, receiving an exciting current of the motor and generating a current feedback signal;
   a central processing unit (CPU), electrically connected with the current detecting component and the motor, and comprising:
   a torque estimating module, computing a torque estimated value based on the current feedback signal;
   an acceleration estimating module, receiving a position feedback signal of the motor and computing an acceleration estimated value based on the position feedback signal;
   a gain computing module, computing a system inertia correspondingly based on the torque estimated value and the acceleration estimated value, and computing an estimated control gain based on a no-load inertia of the motor and the system inertia, wherein the system inertia is an inertia of the motor carrying the load; and
   a controlling module, tuning the servo actuator based on the estimated control gain; and
   a storage, connected with the CPU, recording a data array including the torque estimated value and the acceleration estimated value, and the CPU is configured to read the data array to obtain the torque estimated value and the acceleration estimated value.

13. The servo actuator in claim 12, wherein the CPU is configured to input a test signal to the controlled system by the servo actuator being tuned to cause the motor to perform an operation and to determine whether the controlled system is stable while the motor performs the operation;
   wherein, the CPU is configured to perform a resonance suppression procedure when the controlled system is determined to be under an unstable status where the unstable status can be resolved by the resonance suppression procedure, and to lower a bandwidth corresponded to the estimated control gain and re-tune the actuator based on the estimated control gain with the lowered bandwidth when the unstable status cannot be resolved by the resonance suppression procedure.

14. The servo actuator in claim 13, wherein the CPU is configured to input a sine wave current to the controlled system to cause the motor to operate, the torque estimating module is configured to retrieve the current feedback signal while the motor operates, and the acceleration estimating module is configured to retrieve the position feedback signal while the motor operates.

15. The servo actuator in claim 14, wherein CPU is configured to generate the sine wave current based on a single frequency sine wave within a frequency range between 5 Hz to 15 Hz.

16. The servo actuator in claim 14, wherein the controlling module is configured to perform an initial setting to the servo actuator based on an initial control gain, wherein the initial control gain at least comprises a position gain and a velocity gain set in accordance with a specification of the motor, and the CPU is configured to input the sine wave current to the controlled system by the servo actuator after the initial setting.

17. The servo actuator in claim 16, wherein the CPU is configured to, when an estimation for the system inertia fails, tune the position gain and the velocity gain of the initial control gain to enlarge a velocity response of the controlled system under the frequency corresponded to the sine wave current, and re-perform the initial setting to the servo actuator based on the initial control gain being tuned.

18. The servo actuator in claim 13, wherein the gain computing module is configured to compute the system inertia in accordance with a first formula:

$$J = \frac{T}{\alpha},$$

wherein J is the system inertia, T is the torque estimated value, and a is the acceleration estimated value.

19. The servo actuator in claim 13, wherein the torque estimating module and the acceleration estimating module are configured to retrieve the torque estimated value and the acceleration estimated value respectively at multiple time points after the sine wave current is inputted by the CPU to the controlled system, and the gain computing module is configured to execute a first-order linear regression calculation to generate a regression line based on multiple torque estimated value and multiple acceleration estimated value and regard a slope of the regression line as the system inertia.

20. The serve actuator in claim 13, wherein the servo actuator comprises a bandwidth correspondence table recording expected bandwidths respectively corresponding to different system inertias, wherein the system inertias are inversely proportional to the expected bandwidths, and the gain computing module is configured to inquire the bandwidth correspondence table by the system inertia to correspondingly obtain the expected bandwidth, and decide the estimated control gain based on the expected bandwidth being obtained.

* * * * *